Patented Nov. 3, 1931

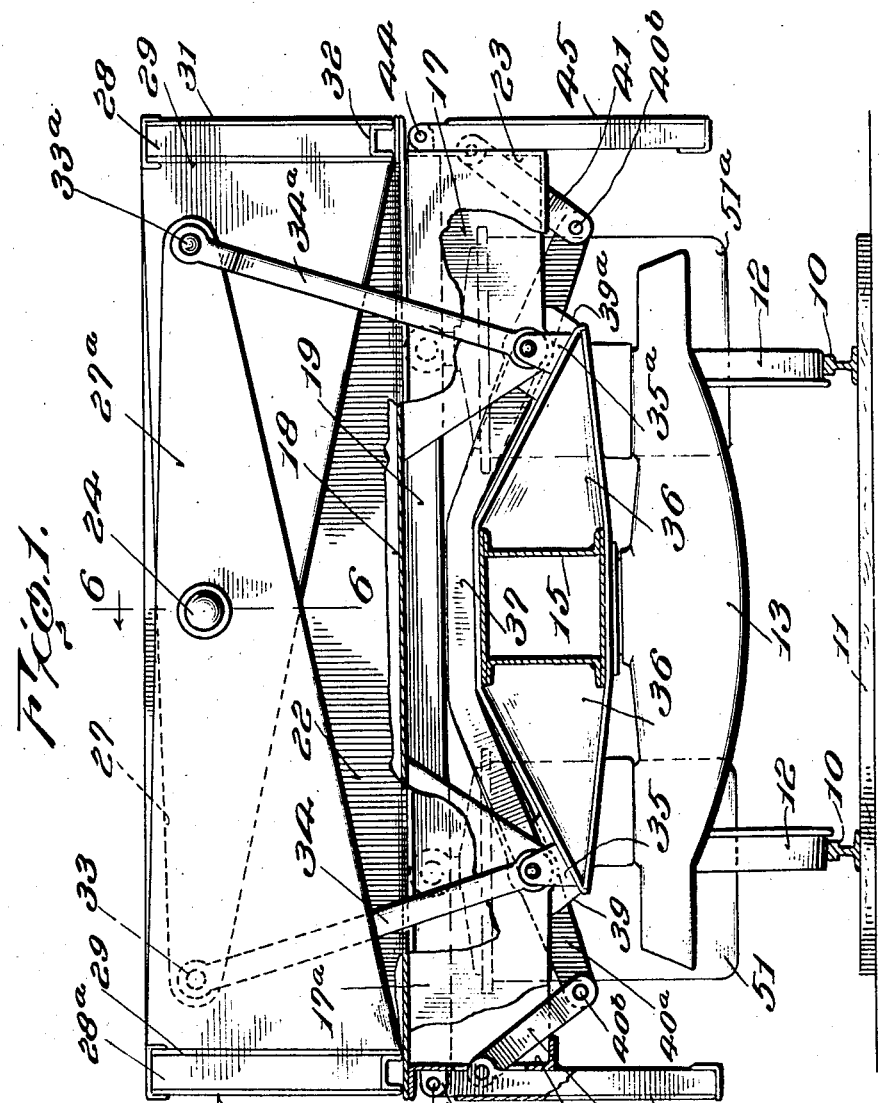

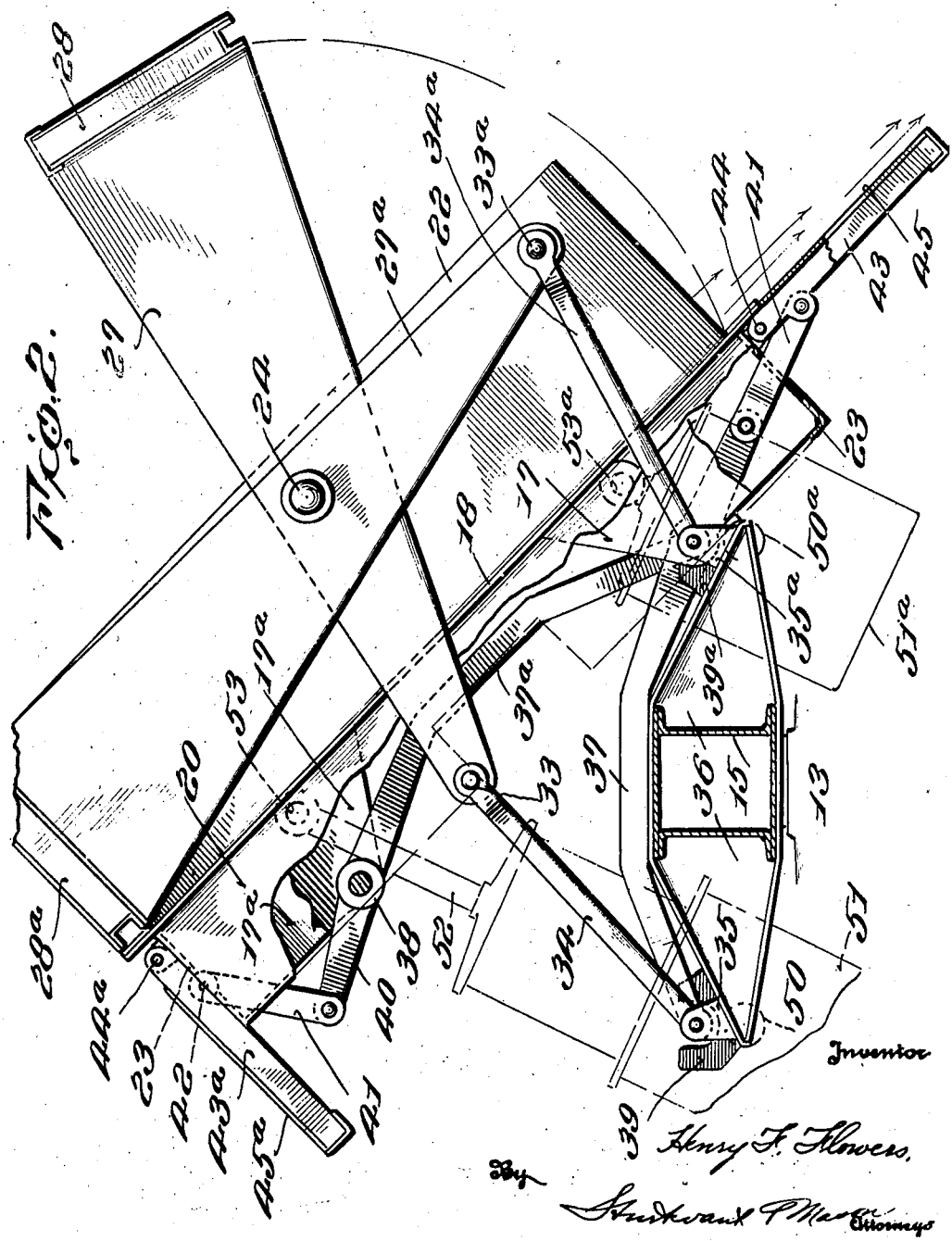

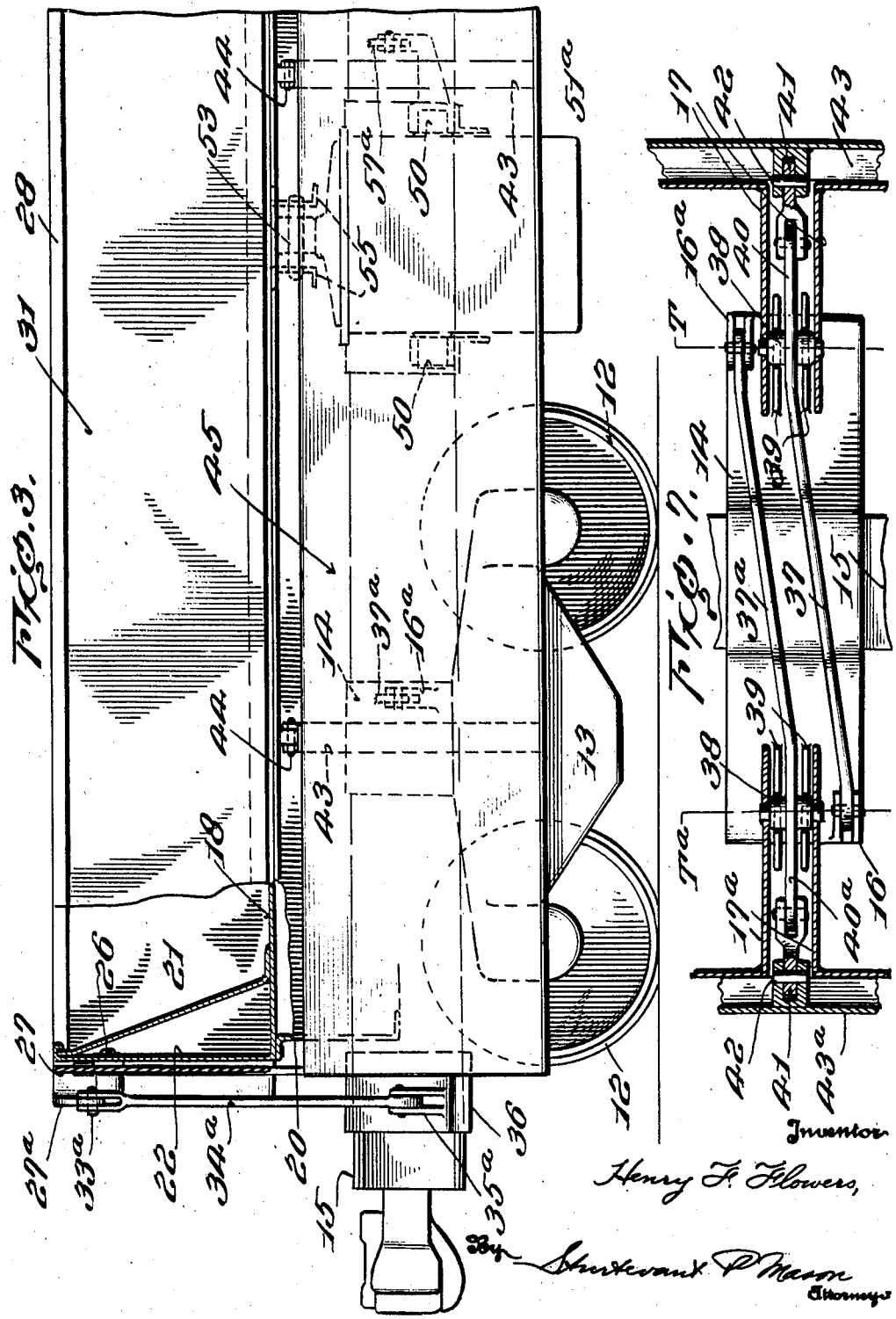

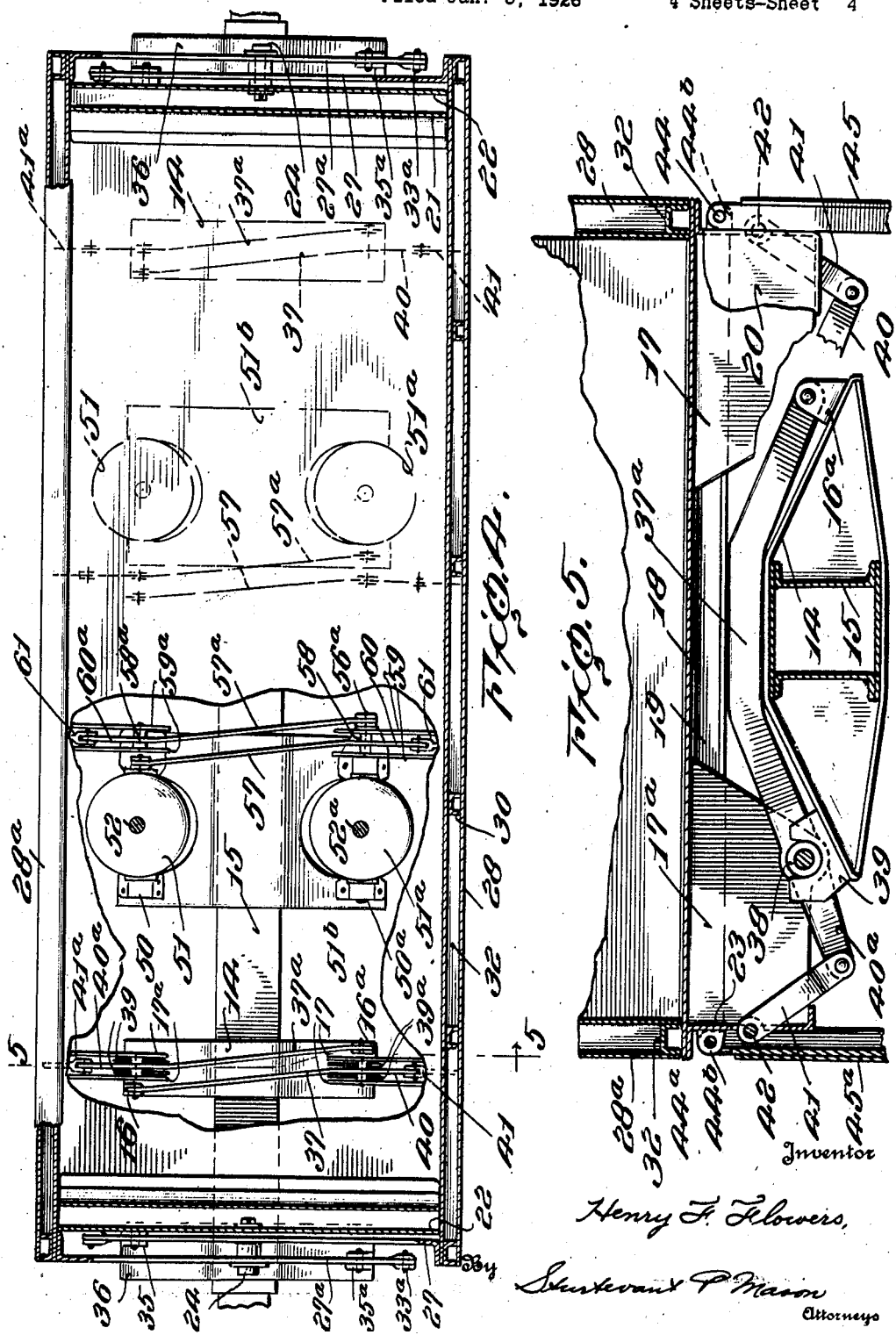

1,830,390

UNITED STATES PATENT OFFICE

HENRY FORT FLOWERS, OF FINDLAY, OHIO

LIFT-DOOR DUMP VEHICLE

Application filed January 5, 1926. Serial No. 79,371.

This invention relates to improvements in side tilting dump vehicles, such as that shown in my copending application, Serial No. 740,307, filed Sept. 17, 1924, now U. S. Patent No. 1,611,012, granted Dec. 14, 1926; and more particularly to door actuating mechanisms therefor.

It has heretofore been proposed by others to provide door actuating mechanisms for dump vehicles in which the door at the lower side of the dump body was automatically opened during tilting, to discharge the load; but so far as I am aware, no such mechanism has been proposed for use with vehicles capable of dumping toward either side, in which the door at the respective side is automatically actuated during the tilting movement, and the opposite door is maintained closed by its own actuating mechanism. During tilting movements in either direction, the dump body is held in a fixed relation to the underframe at a respective trunnion line.

A further feature of the invention is the provision of an apron at the sides of the vehicle which deflect the material during discharging, so that it will not fall back beneath the wheels of the vehicle. This apron during transport is held in withdrawn position, and is moved to operative position during the tilting, and is actuated from the devices employed to hold the dump body in position, in such manner that the apron at the raised side of the car is maintained during the raising at a withdrawn position.

Another feature of the invention is the provision of means to positively control the movements of the doors and the aprons during the transport and tilting of the vehicle.

This invention is applicable to any vehicle capable of tilting for dumping, but is illustrated in the accompanying drawings and described hereinafter as applied to a railway car which may be raised at either side for discharge to the opposite side, by means of raising mechanisms carried upon the car. This is a double trunnion vehicle similar to that shown in the copending application, Serial No. 740,307 above referred to, with the door actuating mechanisms which are likewise selectively controlled in such a way that when the dump vehicle is tilted to one side about the trunnion adjacent to that side, the side door on that same side is opened while the side door on the other side remains closed; the door mechanism being virtually symmetrical about the center line of the vehicle, when the tilting occurs about the other trunnion, the corresponding door on that side is brought into action, while the first door remains closed.

In the drawings:

Figure 1 is an end view of a railway vehicle equipped according to the invention, with certain parts broken away for greater clearness; the dump body being in the transport position.

Fig. 2 is a similar view with the dump body in tilted position.

Fig. 3 is a side view of the vehicle, similarly with parts broken away.

Fig. 4 is a plan view of the vehicle on a reduced scale to illustrate the connection and relation of the various parts, with portions broken away.

Fig. 5 is a section on line 5—5 of Fig. 4.

Fig. 6 is a detail section on line 6—6 of Fig. 1.

Fig. 7 is an enlarged detail of one set of the dump body supporting links, in plan, showing the connection to the apron.

This invention is shown on the drawings as applied to a railway vehicle which travels on the rails 10, 10 mounted on the cross ties 11. The vehicle wheels 12, 12 are supported in the usual manner upon the trucks 13 and are connected to the bolsters 14, carried on the longitudinal car beam 15. The car is provided on the bolsters 14 with suitable trunnion brackets 16, 16a which have the trunnion axes, T, Ta.

The car floor 18 is provided with the usual stiffening members 19 and the gusset plates 17, 17a, and has the end stiffening beams 20. The end of the car body is formed by an end sheet 22 formed integrally with the car floor and bent upwardly at each end of the car, as shown in Fig. 6. The end apron 21 serves as a brace between the floor and this end sheet 22. It will be understood that these various parts are rigidly and solidly connected by riveting and welding to produce a solid and rigid structure. At each side of the car and extending longitudinally thereof is the angle member 23 which serves as a longitudinal girder to support and stiffen the car floor and body, and to which the end beams 20, the various gusset plates 17, 17a and the crossbeams 19 are secured.

Mounted at each end of the car in the end sheet 22 is a pivot bolt or pin 24 which is held in place by suitable retaining washers 25 and the pin 26. Access to the pin 26 may be gained through the removable plate 21b fastened to the apron 21. Each of these bolts carries the two lever plates 27 and 27a, which are respectively solidly and rigidly connected at one side of the car with a side door 28, 28a for the same. The doors each comprise the inner sheet 29 for carrying the load and suitable brace members 30 to stiffen the door, and an outer sheet 31. The bottom edge of the door is formed by a channel iron 32 which is open downwardly and presses its edges and the edges of the sheets 29, 31 solidly against the car floor when in the closed or transport position, so that material cannot escape beneath it.

At the opposite end, the respective lever plates 27, 27a each have a pivot connection 33, 33a, to a link 34, 34a which in turn is pivoted to upstanding brackets 35, 35a on the end frames 36 which, like the bolster frames 14, are rigidly fastened to the car beam 15. The pivot points of the brackets 35, 35a are preferably alined with the trunnion axes, T, Ta.

The transverse links 37, 37a are alternately pivoted on one end at the trunnion axes T, Ta to the respective brackets 16, 16a on the bolster frames 14, and extend transversely across the underframe, and have the guide and seating pivot bushings 38 journalled in the gusset plates 17, 17a in the line of axes T, Ta and adapted to be received in the brackets 39 at the opposite side of the underframe when in the lowered position (see Fig. 7). An extension 40, 40a from each of these links 37, 37a has pivoted thereto a short link 41 whose opposite end is jointed to a pivot 42 mounted on the stiffening angle irons 43, 43a of the metal apron plates 45, 45a at each side of the car. These apron assemblies are pivoted at 44, 44a to ears 44b on the longitudinal dump body beams 23, and may be further stiffened at the free edge by the angle irons 46. The various parts of these aprons and of the doors 31, 31a may be riveted and welded together.

It is preferred to support the raising mechanisms 51, 51a upon the straddle brackets 51b of the underframe, which are rigidly fastened thereto, and carry the trunnions 50, 50a for the raising mechanisms. The axes of these trunnions are substantially in line or slightly below the line of the trunnion axes T, Ta, so that no collapsing movement of one of the raising mechanisms may occur when its mate on the opposite side of the car is tilting the dump body. These mechanisms are shown as fluid pressure cylinders having the telescoping pistons 52, 52a jointed at their upper ends 53, 53a to the underside of the dump body floor in some appropriate manner, for example by the pin 53b passing through the beams 55 of the body floor (Fig. 2).

Additional sets of transverse links 57, 57a, similar to those at 37, 37a are provided adjacent these raising mechanisms so as to hold the dump body in proper position with regard to the underframe during tilting. These links 57, 57a are jointed in line with the trunnion axes T, Ta at the pivots 56, 56a upon the straddle brackets 51b, and have the sleeves 58, 58a carried in the gusset plates 59, 59a of the dump body. The projecting ends 60, 60a of the links are jointed by the short links 61 to the aprons 43, 43a, similar to the link ends 40 and the short links 41. The sleeves 59 also have their axes in the trunnion lines T, Ta.

As shown in Fig. 7, it is preferred to have the transverse links 37, 37a, 57, 57a mounted with their pivots 16, 16a, 56, 56a substantially opposite each other transversely of the car, and to have the intermediate section of these links 37, 37a extending somewhat obliquely across the car. In this way the strains upon the car body are reduced, and the elements are made symmetrical, so that it is unnecessary to provide "rights" and "lefts".

The method of operation of the structure may be seen from Figs. 1 and 2.

When the car body is in the lowered or transport position, shown in Fig. 1, a load of material may be placed therein in any suitable manner to fill the body between the doors. The car may then be hauled to any suitable dumping point. It will be understood that the car may be equipped with any suitable draft controlling mechanisms and provided with devices for accomplishing the actuation of the raising mechanisms 51, 51a in proper order and at the proper time. Such devices are, for example, disclosed in my copending application Serial No. 66,791, filed Nov. 24, 1925, and forms no part of the present invention.

Upon arriving at the chosen point for dumping, this controlling system is manipulated to cause a raising of one side of the dump body, for example, by energizing the fluid pressure cylinders 51. The dump body thereupon tilts about the opposite trunnion line and finally assumes a position such as shown in Fig. 2. During this tilting movement, the door 31 adjacent the trunnion line T selected is tilted and held against downward movement by the link 34 which is pivoted at one end at the opposite trunnion line Ta and at the other end to the lever plate 27 connected to the side door 28. As the pivot point 24 of the lever plate 27 moves sideward and upward, the door 31 is caused to move upward, until it finally assumes a position such as shown in Fig. 2. This upward movement assures a free passage, at the maximum angle of tilt, for the materials which have been loaded upon the car body.

Likewise during this tilting operation, the pivot 44 has moved downward and nearer to the pivot point 40b on the link 37 adjacent the trunnion line selected for tilting. As a result of this movement of the pivot point 44, the link 41 is caused to push outward and upward upon the apron 43 until the latter is presented substantially in line with the car floor 18, so that the last remaining material is delivered along it and substantially free and at a distance from the road bed as represented in Fig. 1 by the cross ties 11. The material dumped therefore does not roll backward upon the road bed and block the passage of the car.

When the body has been raised into the position of Fig. 2 and the material has been dumped therefrom, the controlling system is again manipulated to allow the return of the dump body to the transport position. The weight of the body will normally cause it to telescope the piston rod 52 into the fluid pressure cylinder 51 in the example shown, and the body will move gradually downward at a speed controlled by the escape of fluid from the cylinder. The weight of the door 31 tends to return it to its initial position, which tendency is augmented by the upward thrust of the link 34 upon the opposite end of the lever plate 37.

The pull of the link 41 during the return movement of the body will likewise pull the apron 43 back to its initial position as shown in Fig. 1. By this form of construction, however, a further advantage is obtained in that any material remaining upon the door 43 will tend to push downwardly and inwardly upon the link 41 during the return movement of the body, and to assist in the return of the body to its original position.

During the tilting about the trunnion line T, the other door 28a is held in closed position by its lever plate 27a and the link 34a, since the body and the link 34a rock about the same trunnion line T: the door 28a is therefore held rigidly in its closed position. Also, since the transverse link 37a rocks about this same trunnion line, no actuation of the apron 43a occurs.

It is obvious that changes may be made in the form, arrangement and dimensions of the several elements without departing from the scope of the appended claims.

I claim:

1. The combination of an underframe and a body, trunnions disposed on opposite sides of said underframe, means for securing said body to said underframe whereby said body may be tilted about either of said trunnions for dumping, a door at each side of said body adapted to be raised with respect to the body for dumping, a pair of members to which each door is rigidly connected, means for supporting said pairs of members on said body so that the door may move bodily away from its closed position for the dumping from the body, and means for connecting said members to the underframe whereby when said body is tilted the door at the lowering side is automatically opened.

2. The combination of an underframe and a body, trunnions disposed on opposite sides of said underframe, means for securing said body to said underframe whereby said body may be tilted about either of said trunnions for dumping, a door at each side of said body adapted to be raised with respect to the body for dumping, respective lever arms supporting said doors and pivoted intermediate their lengths to said body at respective longitudinal axes adjacent the center of the vehicle, and means connected to each of said arms at the end opposite the door and connected to said underframe in the line of the trunnion on the side opposite said door to open said respective door with relation to said body during tilting of the latter.

3. The combination of an underframe and a body, trunnions disposed on opposite sides of said underframe, means for securing said body to said underframe whereby said body may be tilted about either of said trunnions for dumping, a door at each side of said body adapted to be raised with respect to the body for dumping, respective substantially horizontal lever arms supporting said doors and pivoted intermediate their lengths to said body, and a link connected to each of said arms at the end opposite the door and connected to said underframe in the line of the trunnion on the side opposite said door.

4. The combination of an underframe and a body, trunnions disposed on opposite sides of said underframe about which said body is adapted to tilt for dumping to the respective side, said trunnions being separated from the center line of the underframe and body so that said body may return from raised position by gravity, transverse links alternately oppositely connected adjacent their ends to the underframe and the body in the line of the trunnion axes whereby said body is maintained in fixed relation to said underframe at at least one trunnion axis, side doors for said body pivoted thereto and adapted to lift relatively away from said body for dumping, and door actuating means connected to said underframe at the trunnion axis opposite the respective door.

5. The combination of an underframe and a body, trunnions disposed on opposite sides of said underframe, means to secure said body to said underframe whereby said body may be tilted about either of said trunnions for dumping, a door at each side of said body, members pivoted to said body and supporting said doors, means connected to said underframe to move the respective said door relatively away from the body when the opposite side of the body is raised in tilting, an apron pivoted at each side of the body and in vertical position during transport of the car, and means actuated during the tilting to move said apron into an inclined chute position.

6. The combination of an underframe and a body, a trunnion disposed at one side of said underframe, means to secure said body to said underframe whereby said body may be tilted about the axis of said trunnion against the action of gravity, a door at the discharge side of said body, members pivoted to said body and supporting said door, means connected to said underframe to raise said door during tilting, an apron pivoted at the discharge side of said body and in vertical position during transport of the car, and means connected to said underframe to move said apron into an inclined chute position during tilting of the body, said body acting during its gravity return from tilted position to control the return of said door and apron to transport position.

7. The combination of an underframe and a body, trunnions disposed on opposite sides of the underframe and about which said body may tilt for dumping, the axes of said trunnions being located more distant from the center plane of said underframe than the center of gravity of said dump body in tilted position, respective transverse links connected alternately at opposite sides to said underframe and said body in the line of said trunnions whereby said body may be tilted about either of said trunnions for dumping, side doors for each side of said body, levers rigidly connected to said doors and journalled intermediate their ends to said body in its center plane, a link connected to each of said levers and to said underframe in the axis line of the trunnion on the opposite side of the car from the respective door, an apron pivoted at each side of said body, an extension on each of said transverse links at its end connected to the said body, and a link connecting each of said extensions with the adjacent apron whereby said apron is moved from a transport position to a chute position during tilting of the vehicle.

8. The combination of an underframe and a body, side doors for said body, chute aprons for said body, trunnions disposed at opposite sides of said underframe, and means for securing said body to said underframe whereby said body may be tilted about either of said trunnions for dumping, and means to move the respective door and apron during such tilting for chute discharge from said body.

9. The combination of an underframe and a body, side doors for said body, chute aprons for said body, trunnions disposed at opposite sides of said underframe, and means for securing said body to said underframe whereby said body may be tilted about either of said trunnions for dumping, and means to positively hold said door and apron in normal position during tilting toward the opposite side of the body.

10. The combination of an underframe and a body, trunnions disposed on opposite sides of said underframe, means for securing said body to said underframe whereby said body may be tilted about either of said trunnions for dumping, a chute apron pivoted adjacent its upper edge at each side of said body, and means whereby said aprons are positively held in normal position during transport and tilting toward the opposite side of the body, and whereby said aprons are positively swung upward during tilting toward the respective side of the body.

11. In a dump vehicle having a frame and body tiltable about fulcrums at opposite sides of the frame, said body resting in stable equilibrium on said fulcrums during normal transport, a door at each side of said body, a pair of members at each end of the vehicle pivoted intermediate their own ends to the body and extending across the vehicle, one of said members at each end of the car being connected to a respective door, and means connecting the other ends of the members to the vehicle frame, said connections to the frame occurring substantially at the fulcrum on the side opposite the respective door whereby the door at the side selected for dumping is caused to open relatively to the body while the door at the other side is maintained closed.

12. In a dump vehicle having a frame and body tiltable about fulcrums at opposite sides of the frame, said body resting in stable equilibrium on said fulcrum during normal transport, a door at each side of said body, lever arms being connected to the respective doors and extending across the vehicle and pivoted to the body thereof, and means connecting the ends of the said respective arms opposite said doors to the frame substantially at the adjacent fulcrum.

13. In a dump vehicle having a frame and body tiltable about fulcrums at opposite sides of the frame, said body resting in stable equilibrium on said fulcrum during normal transport, a door at each side of said body, means pivoted to the body to support the respective doors, and means cooperating with said door supporting means to actuate the same to raise the door away from the body for dumping during the tilting of the body toward a selected side, said means being connected to the frame substantially at the fulcrums.

14. In a dump vehicle, a frame, a dump body rockable selectively about fulcrums at opposite sides of said frames, said fulcrums being spaced apart so that said dump body is supported in stable equilibrium thereon during normal transport, a side door for said body at each side thereof, a pair of members pivoted to said body, connections between each of the members and a respective door, said members extending laterally from their body pivot connections to a point substantially above the fulcrum at the side opposite the door controlled by the respective lever, and a respective link for each member located substantially vertically in the normal transport position of the body and pivoted to the frame and to the member adjacent the extended end.

15. In a dump vehicle, a frame, a dump body rockable selectively about fulcrums at opposite sides of said frame, said fulcrums being spaced apart so that said dump body is supported in stable equilibrium thereon during normal transport, a side door for said body at each side thereof, a pair of lever members pivoted to the body intermediate said fulcrums, connections between each of said members and a respective door, respective link connections on each of said lever members to the frame at a point of the latter substantially in the line of the fulcrum on the side opposite the respective door, said lever members acting in tension during the tilting of the body to produce the opening of the door at the lower side of the body and acting in compression to retain the doors closed during normal transport and to hold the door at the upper side of the body closed during tilting.

16. In a dump vehicle, a frame, a dump body rockable selectively about fulcrums at opposite sides of said frames, means for selectively tilting said body, a side door at each side of said body and supporting means for each door pivoted to said body substantially in the central vertical plane thereof, said door moving bodily with respect to said body for opening, a door controlling means for each door including a member cooperating with said door supporting means at the side opposite the respective door, and a connection between each of said door controlling members and the frame so disposed that the member controlling the door at the lower side of the tilted body maintains a substantially fixed relation with the frame at said respective connection, while the member and door supporting means for the door at the other side remain in substantially fixed relation with the body, so that the door at the upper side of the body remains closed during dumping and the door at the lower side of the body is controlled during its opening and closing movement.

17. In a dump vehicle, a frame, a dump body rockable selectively about fulcrums at opposite sides of said frame, said fulcrums being spaced apart so that said dump body is supported in stable equilibrium thereon during normal transport, a side door for said body at each side thereof, door supporting means pivoted to said body substantially at the central longitudinal plane thereof so that the respective door will move bodily with respect to the body for dumping, and independent devices for each door attached to said supporting means and attached to the frame substantially at the fulcrum opposite said respective door for automatically, independently and selectively controlling the opening and closing of the door through which dumping is to be effected, throughout the entire movement thereof, said body operating through the pivotal connection for the respective door supporting means and through said devices for holding the doors closed while said body is supported on both fulcrums for transport.

18. In a dump vehicle having a frame and a body tiltable about fulcrums at opposite sides of the frame, said body resting in stable equilibrium of said fulcrums during normal transport, a door at each side of said body, and door operating devices for each of said doors connected to said body substantially in the central vertical plane thereof and connected to said frame substantially at the fulcrum on the side opposite the respective doors for automatically, independently and selectively controlling the opening of the door through which dumping is to be effected.

19. In a dump vehicle having a frame and a body tiltable about fulcrums at opposite sides of the frame, said body resting in stable equilibrium on said fulcrums during normal transport, a door at each side of said body, and door operating devices for each of said doors connected to said body substantially in the central vertical plane thereof and connected to said frame substantially at the fulcrum on the side opposite the respective doors for automatically, independently and selectively controlling the closing of the door through which dumping has been effected.

20. In a dump vehicle having a frame and a body tiltable about fulcrums at opposite sides of the frame, said body resting in stable equilibrium on said fulcrums during normal transport, a door at each side of said body, and door operating devices for each of said doors connected to said body substantially in the central vertical plane thereof and connected to said frame substantially at the fulcrum on the side opposite the respective doors for automatically, independently and selectively controlling the opening and closing of the door through which dumping is effected, throughout the entire movement thereof, said body operating through said devices for holding the doors closed while said body is supported on both fulcrums for transport.

In testimony whereof, I affix my signature.

HENRY FORT FLOWERS.